US012798496B2

(12) United States Patent
Jiang et al.

(10) Patent No.: US 12,798,496 B2
(45) Date of Patent: Nov. 17, 2026

(54) DECORATIVE ASSEMBLY, ASSEMBLY METHOD OF DECORATIVE ASSEMBLY, AND VEHICLE WINDOW

(71) Applicant: FUYAO GLASS INDUSTRY GROUP CO., LTD., Fuqing (CN)

(72) Inventors: Lixing Jiang, Fuqing (CN); Min Wang, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 420 days.

(21) Appl. No.: 18/431,207

(22) Filed: Feb. 2, 2024

(65) Prior Publication Data

US 2024/0174186 A1 May 30, 2024

Related U.S. Application Data

(63) Continuation of application No. PCT/CN2022/114396, filed on Aug. 24, 2022.

(30) Foreign Application Priority Data

Aug. 25, 2021 (CN) ......................... 202110985117.X

(51) Int. Cl.
*B60R 13/04* (2006.01)

(52) U.S. Cl.
CPC .................................... *B60R 13/04* (2013.01)

(58) Field of Classification Search
CPC ................................ B60P 16/04; B60R 13/04
(Continued)

(56) References Cited

U.S. PATENT DOCUMENTS 4,621,469 A * 11/1986 Kruschwitz .............. B60J 10/70
52/716.5
5,560,175 A * 10/1996 Soyka, Jr. ............... B60R 13/04
52/716.5
(Continued)

FOREIGN PATENT DOCUMENTS

CN 1878646 A 12/2006
CN 109959144 A 7/2019
(Continued)

OTHER PUBLICATIONS

Examination report issued in corresponding EP application No. 22860522.6 dated Apr. 24, 2025.
(Continued)

*Primary Examiner* — Jason S Morrow
(74) *Attorney, Agent, or Firm* — Scully, Scott, Murphy & Presser, P.C.

(57) ABSTRACT

A decorative assembly is provided. The decorative assembly includes a decorative member, a bearing member, a boss, and an adhesive member. The bearing member is arranged at a side of the decorative member and includes a support portion and an adhesive portion. The boss is arranged at a side of the decorative member close to the bearing member. When the decorative member and the boss are moved in a direction towards the bearing member and the boss abuts against the support portion, the adhesive member and the decorative member cooperatively define a gap or the adhesive member and the adhesive portion cooperatively define a gap. When the boss applies pressure to the support portion, the support portion at least partially deforms to define an accommodating space, the boss is partially received in the accommodating space, and the adhesive portion and the decorative member are adhered together by the adhesive member.

20 Claims, 13 Drawing Sheets

(58) Field of Classification Search
USPC .......................................... 296/1.08; 52/716.5
See application file for complete search history.

(56) References Cited

U.S. PATENT DOCUMENTS

| | | | | |
|---|---|---|---|---|
| 6,412,852 | B1 * | 7/2002 | Koa | B60R 13/0206 296/146.7 |
| 6,767,049 | B1 * | 7/2004 | Morrison | B60R 13/0206 296/146.7 |
| 6,810,635 | B2 * | 11/2004 | Meizlish | B60J 10/35 52/716.5 |
| 7,841,641 | B2 * | 11/2010 | Ohzono | B62J 50/40 40/911 |
| 7,854,101 | B2 * | 12/2010 | Swayne | B60R 13/04 52/716.5 |
| 8,070,204 | B2 * | 12/2011 | Mourou | B60R 13/0206 296/187.02 |
| 9,012,006 | B2 * | 4/2015 | Fisk | B32B 3/06 156/95 |
| 2002/0139081 | A1 * | 10/2002 | Nada | B60R 13/04 52/716.5 |
| 2006/0179786 | A1 * | 8/2006 | Kreye | B60J 10/30 52/716.5 |
| 2007/0085361 | A1 * | 4/2007 | Hauser | B60R 13/04 296/1.08 |
| 2014/0145463 | A1 * | 5/2014 | Takayama | B60J 10/20 156/295 |
| 2015/0283956 | A1 * | 10/2015 | Halliwell | B60J 5/0468 403/269 |
| 2023/0271484 | A1 * | 8/2023 | Takahashi | B29C 45/14377 |
| 2025/0010695 | A1 * | 1/2025 | Jiang | B60J 10/23 |

FOREIGN PATENT DOCUMENTS

| | | | | |
|---|---|---|---|---|
| CN | 211114554 | U | | 7/2020 |
| CN | 211195801 | U | | 8/2020 |
| CN | 213237386 | U | | 5/2021 |
| CN | 113043817 | A | | 6/2021 |
| CN | 113060078 | A | | 7/2021 |
| DE | 102010011321 | A1 | | 9/2011 |
| EP | 0468873 | A1 | | 1/1992 |
| EP | 1344687 | A2 | | 9/2003 |
| EP | 2684744 | A1 | | 1/2014 |
| FR | 2665129 | B1 | * | 11/1992 |
| FR | 2771120 | A1 | | 5/1999 |
| GB | 1396111 | A | | 6/1975 |
| JP | H03222729 | A | | 10/1991 |
| JP | H06305371 | A | | 11/1994 |
| JP | H07115587 | B2 | * | 12/1995 |
| JP | 2007020847 | A | | 2/2007 |
| JP | 2019182263 | A | | 10/2019 |
| JP | 7059769 | B2 | * | 4/2022 |

OTHER PUBLICATIONS

Examination report issued in corresponding EP application No. 22860522.6 dated Aug. 28, 2025.

Notice of Allowance dated Jun. 21, 2022 issued in CN 202110985117.X.

International Search Report dated Nov. 29, 2022 issued in PCT/CN2022/114396.

Extended European search report dated Oct. 1, 2024 received in European Patent Application No. 22860522.6.

* cited by examiner

MOVE THE DECORATIVE MEMBER AND THE BOSS IN THE DIRECTION TOWARDS THE BEARING MEMBER TO APPLY PRESSURE TO EACH OF THE MULTIPLE SECOND PORTIONS BY THE BOSS UNTIL EACH OF THE MULTIPLE SECOND PORTIONS AT LEAST PARTIALLY DEFORMS AND IS AT LEAST PARTIALLY RECEIVED IN THE AVOIDANCE GROOVE TO DEFINE THE ACCOMMODATING SPACE

S510

FIG. 19

CONTINUE TO APPLY PRESSURE TO THE SECOND PORTION BY THE BOSS TO CONTINUOUSLY MOVE THE BOSS TOWARDS THE AVOIDANCE GROOVE, WHERE WHEN THE BOSS IS MOVED A PRESET DISTANCE, THE SECOND PORTION RESTORES AND IS RECEIVED IN THE MOUNTING SPACE, AND THE BOSS IS PARTIALLY RECEIVED IN THE AVOIDANCE GROOVE

S511

FIG. 20

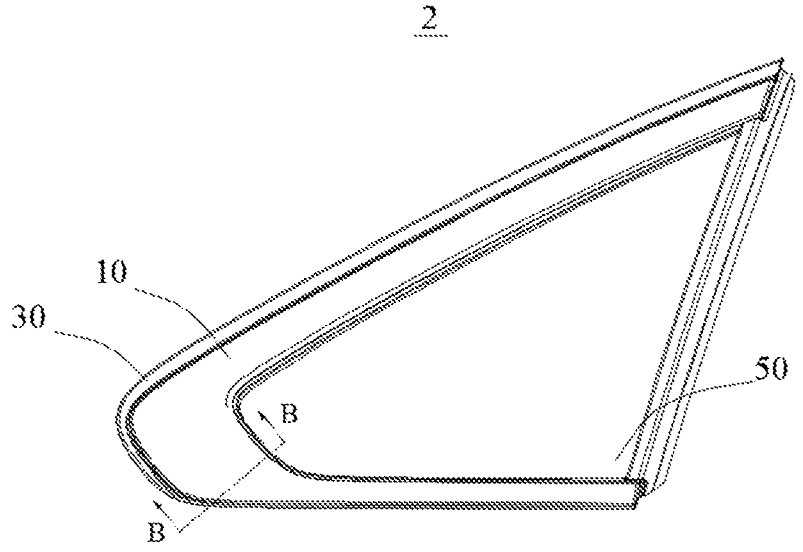

FIG. 21

DECORATIVE ASSEMBLY, ASSEMBLY METHOD OF DECORATIVE ASSEMBLY, AND VEHICLE WINDOW

CROSS-REFERENCE TO RELATED APPLICATION(S)

This application is a continuation of International Application No. PCT/CN2022/114396, filed Aug. 24, 2022, which claims priority to Chinese Patent Application No. 202110985117.X, filed Aug. 25, 2021, the entire disclosures of both of which are incorporated herein by reference.

TECHNICAL FIELD

The disclosure relates to the field of assembly technologies of decorative members, and more particularly, to a decorative assembly, an assembly method of the decorative assembly, and a vehicle window.

BACKGROUND

Decorative members have outstanding appearance performance and are usually adhered to various bearing members by adhesive members. During assembly, generally, the decorative member is first positioned relative to the bearing member and then is adhered to the bearing member. However, at present, accurate positioning may not be realized with a single adjustment. In the case where there is a gap between the decorative member and the bearing member after the decorative member is adhered to the adhesive member, it is difficult to adjust the position of the decorative member once more to eliminate the gap.

SUMMARY

In view of above, in the first aspect of the disclosure, a decorative assembly is provided. The decorative assembly includes a decorative member, a bearing member, a boss, and an adhesive member. The bearing member is arranged at a side of the decorative member and includes a support portion and an adhesive portion arranged at a periphery of the support portion. The boss is arranged at a side of the decorative member close to the bearing member and arranged facing towards the support portion. The adhesive member is arranged between the adhesive portion and the decorative member. When the decorative member and the boss are moved in a direction towards the bearing member and the boss abuts against the support portion, the adhesive member and the decorative member cooperatively define a gap or the adhesive member and the adhesive portion cooperatively define a gap. When the boss applies pressure to the support portion, the support portion at least partially deforms to define an accommodating space, the boss is at least partially received in the accommodating space, and the adhesive portion and the decorative member are adhered together by the adhesive member.

In the decorative assembly provided in the first aspect of the disclosure, the boss is arranged at the side of the decorative member, the bearing member is divided into the support portion and the adhesive portion, and the support portion may deform under external forces. Therefore, in a process that the decorative member and the boss are moved in the direction towards the bearing member, when the boss abuts against the support portion, the adhesive member and the decorative member may cooperatively define a gap (which may also be understood as that the adhesive member is not adhered to the decorative member), or the adhesive member and the adhesive portion may cooperatively define a gap (which may also be understood as that the adhesive member is not adhered to the adhesive portion). With the aid of the gap, secondary adjustment of the decorative member relative to the bearing member may be performed to correct a deviation between the decorative member and the bearing member, thereby realizing fine adjustment of the decorative member, and thus improving positioning accuracy and a yield.

In addition, after accurate positioning, pressure may be continuously applied to the boss to move the decorative member and the boss in the direction towards the bearing member. In this case, the support portion deforms to allow the boss to be at least partially received in the accommodating space of the support portion, and thus the decorative member and the adhesive portion are adhered together by the adhesive member, thereby realizing assembly of the decorative assembly and obtaining the decorative assembly.

The support portion includes multiple second portions spaced apart from each other and a first portion. The adhesive portion is arranged at a periphery of the first portion. The first portion defines an avoidance groove at a side of the first portion close to the decorative member. The multiple second portions are connected to the first portion and arranged corresponding to the periphery of the first portion. Each of the multiple second portions is arranged extending towards remaining second portions in the multiple second portions. When the decorative member and the boss are moved in the direction towards the bearing member and the boss applies pressure to each of the multiple second portions, each of the multiple second portions at least partially deforms and is partially received in the avoidance groove, so as to define the accommodating space.

The boss defines a mounting space at a peripheral side of the boss. When the decorative member and the boss are moved in the direction towards the bearing member and the boss applies pressure to each of the multiple second portions, each of the multiple second portions first at least partially deforms to define the accommodating space, and then restores and is partially received in the mounting space, and the boss is partially received in the avoidance groove.

The multiple second portions are arranged on a surface of the first portion close to the decorative member; or a surface of the first portion close to the decorative member is flush with a surface of each of the multiple second portions close to the decorative member.

The support portion is elastic.

The boss includes a base and a protruding portion connected to the base. The base is connected to the decorative member, and the protruding portion is farther away from the decorative member than the base.

In the second aspect of the disclosure, an assembly method of a decorative assembly is provided. The assembly method includes the following. Provide a decorative member and a boss, where the boss is arranged at a side of the decorative member. Provide a bearing member and an adhesive member, where the bearing member includes a support portion and an adhesive portion arranged at a periphery of the support portion, and the adhesive member is adhered to a side of the adhesive portion close to the decorative member or adhered to a side of the decorative member close to the adhesive portion. Move the decorative member and the boss in a direction towards the bearing member until the boss abuts against the support portion, and the adhesive member and the decorative member cooperatively define a gap or the adhesive member and the adhesive portion cooperatively define a gap. Adjust a position of the decorative member relative to the bearing member. Apply pressure to the support portion by the boss to cause the support portion to at least partially deform to define an accommodating space, and continue to move the boss in the direction towards the bearing member until the boss is at least partially received in the accommodating space, and the adhesive portion and the decorative member are adhered together by the adhesive member.

With the assembly method provided in the second aspect of the disclosure, move the decorative member and the boss in the direction towards the bearing member until the boss abuts against the support portion, and the adhesive member and the decorative member cooperatively define a gap (which may be understood as that the adhesive member is separated from the decorative member by the boss or the adhesive member is not adhered to the decorative member) or the adhesive member and the adhesive portion cooperatively define a gap (which may be understood as that the adhesive member is not adhered to the adhesive portion). Therefore, there is a chance for secondary adjustment of the position of the decorative member to improve positioning accuracy and a yield.

In addition, after secondary adjustment of the position of the decorative member, apply pressure to the support portion by the boss to eliminate the gap between the adhesive member and the decorative member or the gap between the adhesive member and the adhesive portion. In this case, the support portion deforms and the boss is partially received in the support portion, that is, the support portion defines the accommodating space to receive the boss, and thus the decorative member and the adhesive portion are adhered together by the adhesive member, thereby completing the assembly of the decorative assembly.

The support portion includes multiple second portions spaced apart from each other and a first portion. The adhesive portion is arranged at a periphery of the first portion. The first portion defines an avoidance groove at a side of the first portion close to the decorative member. The multiple second portions are connected to the first portion and arranged corresponding to the periphery of the first portion. Each of the multiple second portions is arranged extending towards remaining second portions in the multiple second portions. Apply pressure to the support portion by the boss to cause the support portion to at least partially deform to define the accommodating space as follows. Move the decorative member and the boss in the direction towards the bearing member to apply pressure to each of the multiple second portions by the boss until each of the multiple second portions at least partially deforms and is at least partially received in the avoidance groove to define the accommodating space.

The boss defines a mounting space at a peripheral side of the boss. After moving the decorative member and the boss in the direction towards the bearing member to apply pressure to each of the multiple second portions by the boss until each of the multiple second portions at least partially deforms and is at least partially received in the avoidance groove to define the accommodating space, the method further includes the following. Continue to apply pressure to the multiple second portions by the boss to continuously move the boss towards the avoidance groove, where when the boss is moved a preset distance, each of the multiple second portions restores and is received in the mounting space, and the boss is partially received in the avoidance groove.

In the third aspect of the disclosure, a vehicle window is provided. The vehicle window includes a window body and the decorative assembly provided in the first aspect of the disclosure. The bearing member defines an accommodating groove at a side of the bearing member. The window body is partially received in the accommodating groove, and the window body and the decorative member are arranged at two adjacent sides of the bearing member.

The vehicle window provided in the third aspect of the disclosure adopts the decorative assembly provided in the first aspect of the disclosure. The boss is arranged on the decorative member, and the support portion facing towards the boss is arranged on the bearing member. When the boss abuts against the support portion, the adhesive member and the decorative member cooperatively define the gap, or the adhesive member and the adhesive portion cooperatively define the gap. In this case, the adhesive member is not adhered to the decorative member or the adhesive portion. Therefore, secondary adjustment of the position of the decorative member may be performed to eliminate a gap between the decorative member and the bearing member, thereby improving a yield of vehicle decorative assemblies.

BRIEF DESCRIPTION OF THE DRAWINGS

In order to describe technical solutions in embodiments of the disclosure more clearly, the following will give an illustration to accompanying drawings required for describing embodiments. Based on these drawings, those of ordinary skill in the art may also obtain other drawings without creative effort.

FIG. 19 is an assembly flow chart illustrating an operation at S500 in FIG. 18.

FIG. 20 is a flow chart illustrating an operation after an operation at S510 in FIG. 19.

FIG. 21 is a top view of a vehicle window provided in an embodiment of the disclosure.

Reference signs: decorative assembly—1; vehicle window—2; decorative member—10; boss—20; bearing member—30; adhesive member—40; window body—50; decorative surface—101; adhesive surface—102; base—201; protruding portion—202; support portion—301; adhesive portion—302; accommodating groove—303; mounting space—2021; first portion—3011; second portion—3012.

DETAILED DESCRIPTION

Exemplary embodiments of the disclosure will be described in the following. It may be noted that those of ordinary skill in the art can make improvements and changes without departing from the principle of the disclosure, and all these improvements and changes may fall within the protection scope of the appended claims of the disclosure.

Technical problems in the related art will be introduced in detail before describing technical solutions in the disclosure.

In the related art, especially in an assembly field of a decorative assembly 1, a decorative member 10 and a bearing member 30 are usually adhered together by an adhesive member 40 to improve appearance effect. In the case where there is a gap between the decorative member 10 and the bearing member 30 after the decorative member 10 is adhered to the adhesive member 40, it is difficult to adjust the position of the decorative member 10 due to a large adhesive force of the adhesive member 40. In addition, during pre-positioning the decorative member 10 on the bearing member 30, if the decorative member 10 partially touches the adhesive member 40 by accident, the position of the decorative member 10 may need to be adjusted. However, in order to adjust the position of the decorative member 10, the decorative member 10 needs to be separated from the adhesive member 40, as a result, the adhesive member 40 is prone to distortion and deformation and thus cannot be used for adhering the decorative member 10, or the decorative member 10 may be distorted and scrapped, for example, a metal bright strip of a vehicle may be prone to optical distortion due to external forces, resulting in an increase of assembly costs and time.

Currently, an additional buckle may be manually disposed on the bearing member 30 and an additional hook may be manually disposed on the decorative member 10, and the decorative member 10 is fixedly connected to the bearing member 30 through a connection between the buckle and the hook. However, with this structure, the gap between the decorative member 10 and the bearing member 30 may only be controlled to a possible minimum, and secondary adjustment cannot be performed to eliminate the gap between the decorative member 10 and the bearing member 30.

Figure 1:
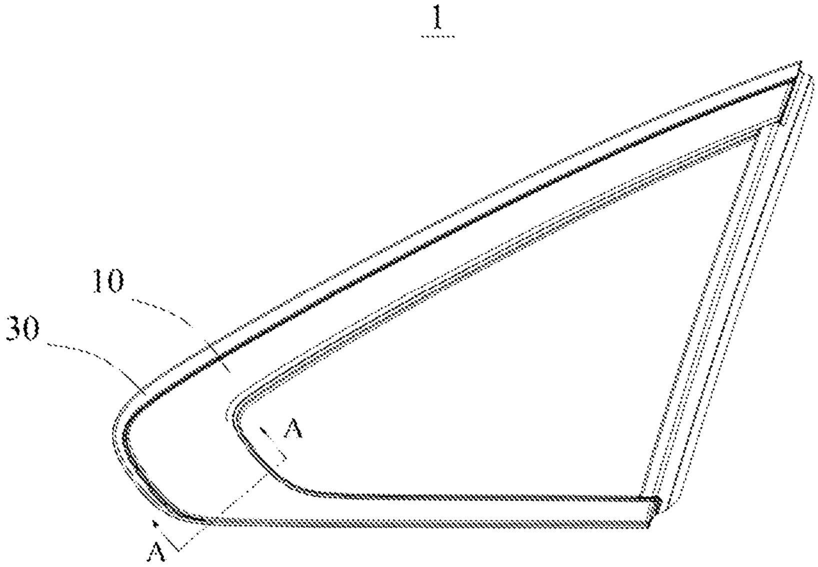
FIG. 1 is a top view of a decorative assembly provided in an embodiment of the disclosure.
Figure 2:
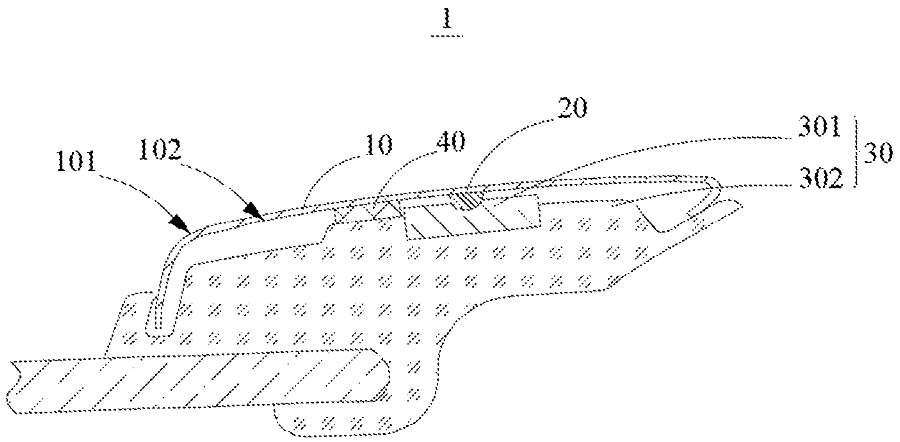
FIG. 2 is a schematic cross-sectional view of FIG. 1, taken along line A-A.
Figure 3:
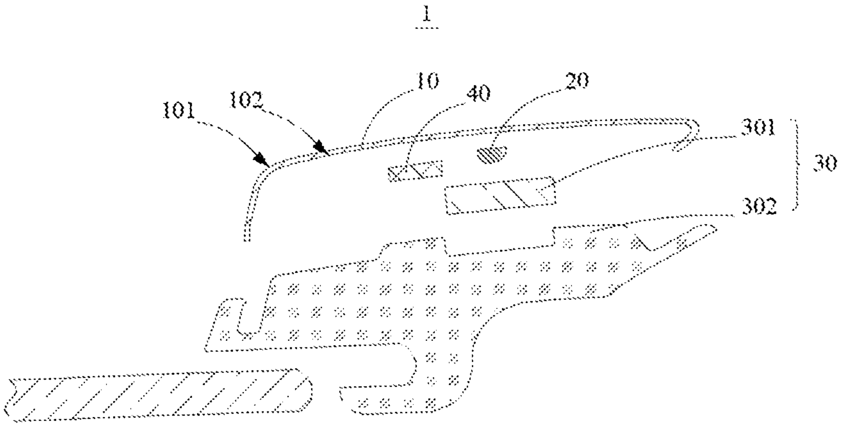
FIG. 3 is an exploded view of FIG. 1.
Figure 4:
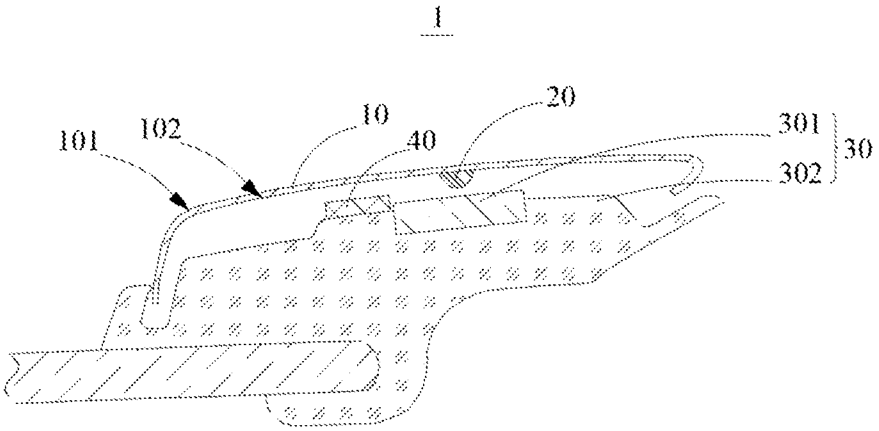
FIG. 4 is a schematic cross-sectional view of FIG. 1 when a boss does not abut against a support portion, taken along line A-A.
Figure 5:
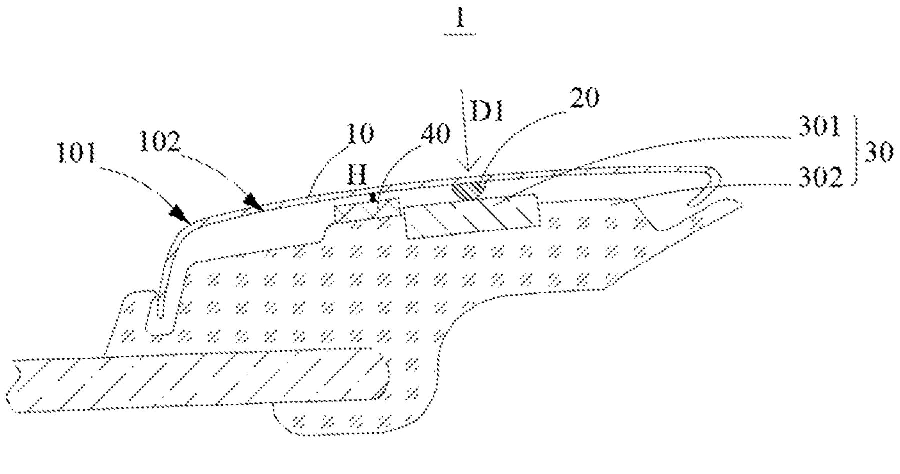
FIG. 5 is a schematic cross-sectional view of FIG. 1 when the boss abuts against the support portion and an adhesive member is not adhered to a decorative member, taken along line A-A.

In view of above, the disclosure provides a decorative assembly 1 to solve the above problems. As illustrated in FIGS. 1 to 5, FIG. 1 is a top view of a decorative assembly provided in an embodiment of the disclosure, FIG. 2 is a schematic cross-sectional view of FIG. 1, taken along line A-A, FIG. 3 is an exploded view of FIG. 1, FIG. 4 is a schematic cross-sectional view of FIG. 1 when a boss does not abut against a support portion, taken along line A-A, and FIG. 5 is a schematic cross-sectional view of FIG. 1 when the boss abuts against the support portion and an adhesive member is not adhered to a decorative member, taken along line A-A.

The decorative assembly 1 is provided in the embodiment. The decorative assembly 1 includes a decorative member 10, a bearing member 30, a boss 20, and an adhesive member 40. The bearing member 30 is arranged at a side of the decorative member 10 and includes a support portion 301 and an adhesive portion 302 arranged at a periphery of the support portion 301. The boss 20 is arranged at a side of the decorative member 10 close to the bearing member 30 and arranged facing towards the support portion 301. The adhesive member 40 is arranged between the adhesive portion 302 and the decorative member 10. When the decorative member 10 and the boss 20 are moved in a direction towards the bearing member 30 and the boss 20 abuts against the support portion 301, the adhesive member 40 and the decorative member 10 cooperatively define a gap, or the adhesive member 40 and the adhesive portion 302 cooperatively define a gap. When the boss 20 applies pressure to the support portion 301, the support portion 301 at least partially deforms to define an accommodating space, the boss 20 is at least partially received in the accommodating space, and the adhesive portion 302 and the decorative member 10 are adhered together by the adhesive member 40.

In addition, the terms "include" and "comprise" as well as variations thereof are intended to cover non-exclusive inclusion.

The decorative assembly 1 provided in the embodiment may serve a decoration function to improve appearance performance. The decorative assembly 1 provided in the embodiment may be applied to various fields and structures. In the embodiment, only an example that the decorative assembly 1 is applied to a vehicle window 2 is taken for exemplary illustration, which does not mean that the decorative assembly 1 in the embodiment can only be applied to the vehicle window 2. In other embodiments, the decorative assembly 1 may be applied to other structures, such as architectural decoration, home decoration, ornament decoration, and the like.

The decorative assembly 1 provided in the embodiment includes the decorative member 10. The decorative member 10 is usually used for improving aesthetic effect, setting off other components, etc., and even the decorative member 10 may improve corrosion resistance, waterproof performance, and the like of the bearing member 30. The decorative member 10 may include, but is not limited to, a sticker, a decorative strip, a decorative plate, etc. The material of the decorative member 10 may include but is not limited to plastic, metal, etc. The decorative member 10 provided in the disclosure may be a component in any shape, which is not limited in the disclosure. Optionally, the shape of the decorative member 10 may match a shape of the bearing member 30. The decorative member 10 has a decorative surface 101 at one side of the decorative member 10 and has an adhesive surface 102 at the other side of the decorative member 10. The decorative surface 101 is for the purpose of decoration, and the adhesive surface 102 is for adhering the adhesive member 40. Specifically, when the decorative assembly 1 in the embodiment is applied to a vehicle, the decorative member 10 provided in the embodiment may be disposed at an outer periphery of the vehicle, and the adhesive surface 102 is closer to the vehicle window 2 than the decorative surface 101.

The decorative assembly 1 provided in the embodiment further includes the boss 20. The boss 20 is arranged on the adhesive surface 102 of the decorative member 10. Optionally, the decorative member 10 and the boss 20 may be integrally formed, or the decorative member 10 and the boss 20 may be two separate components. The boss 20 is connected to the adhesive surface 102 of the decorative member 10. The boss 20 may be in a shape including, but not limited to, a cylinder, an elliptical cylinder, a cube, a cuboid, etc. Preferably, the boss 20 with a curved surface is adopted in the embodiment, and the curved surface faces away from the decorative member 10. In addition, the specific structure of the boss 20 on the decorative member 10 will be described in detail in the following.

The decorative assembly 1 provided in the embodiment further includes the bearing member 30. Various structural members are generally arranged on the bearing member 30, for example, the decorative member 10 is arranged on the bearing member 30. In the case where the bearing member 30 is applied to a glass of the vehicle window 2, the bearing member 30 may be an encapsulation. Optionally, the encapsulation may be made of an injection molding material. The material of the bearing member 30 may include but is not limited to plastic, rubber, and the like. The bearing member 30 provided in the disclosure may be a component in any shape, which is not limited in the disclosure. For the convenience of understanding, the bearing member 30 is artificially divided into a support portion 301 and an adhesive portion 302. In practical production, the support portion 301 and the adhesive portion 302 may be integrally formed with remaining parts of the bearing member 30, i.e., the support portion 301, the adhesive portion 302, and the remaining parts of the bearing member 30 are manufactured through one process (e.g., injection molding), or the support portion 301 and the adhesive portion 302 may be two separate structural members. Optionally, the support portion 301 and the adhesive portion 302 may be manufactured first, and then the remaining parts of the bearing member 30 may be manufactured, and the support portion 301 and the adhesive portion 302 may be mounted to form the bearing member 30. Alternatively, the support portion 301 and the adhesive portion 302 may be manufactured first, and then the bearing member 30 may be integrally manufactured (e.g., by injection molding) based on the support portion 301 and the adhesive portion 302. The adhesive portion 302 is configured to connect the adhesive member 40, and the adhesive member 40 is arranged on part of the adhesive portion 302. The support portion 301 is configured to support the boss 20 on the decorative member 10. The boss 20 that has a curved surface is used in the embodiment, and the curved surface faces towards the support portion 301. In addition, the support portion 301 may deform under external forces. In other words, when an external force is applied to the support portion 301 by the boss 20, the support portion 301 deforms to define the accommodating space, and the boss 20 is partially received in the accommodating space. In this case, the gap between the decorative member 10 and the adhesive member 40 disappears, that is, the bearing member 30 and the decorative member 10 are adhered together by the adhesive member 40. The bearing member 30 may be partially manufactured in a manner including, but not limited to, injection molding, blow molding, extrusion molding, and the like. Optionally, the specific structure of the support portion 301 of the bearing member 30 will be described in detail in the following.

Optionally, a positioning stage is arranged at a surface of the bearing member 30 close to the decorative member 10. The positioning stage is arranged on the adhesive portion 302 of the bearing member 30 and corresponds to the decorative member 10, and the positioning stage is configured to assist in accurate positioning of the decorative member 10. For the convenience of understanding, the positioning stage is defined by artificially dividing the bearing member, i.e., the positioning stage is a portion of the bearing member 30, and the positioning stage and the bearing member 30 are integrally formed. For example, in the case where the decorative assembly 1 provided in the disclosure is not applied, the decorative member 10 is usually pre-positioned via the positioning stage of the bearing member 30, and then the decorative member 10 is adhered to the adhesive member 40 to complete assembly. In this manner, a fitting degree between the decorative member 10 and the bearing member 30 just reaches 90%, and there is only one chance to adjust the position of the decorative member 10, and thus the positioning stage is not fully functioning. However, in the case where the decorative assembly 1 provided in the disclosure is applied, the decorative member 10 may be preliminarily positioned at the bearing member 30 first, and then when the boss 20 abuts against the support portion 301, secondary adjustment of the position of the decorative member 10 may be performed according to the preset positioning stage, such that the fitting degree between the decorative member 10 and the bearing member 30 may reach 99%, . . . , or 100%. Since there is a chance for secondary adjustment of the position of the decorative member 10, the accuracy of positioning of the decorative member 10 may be improved, and thus the yield may be improved.

Optionally, a positioning groove is defined at a side of the adhesive portion 302 close to the decorative member 10. The positioning groove is close to the decorative surface 101, and a periphery of the decorative member 10 is received in the positioning groove. The positioning groove is configured to accommodate remaining part of the decorative member 10, and the decorative member 10 is bendably received in the positioning groove. In addition, when the decorative member 10 is not adhered to the adhesive member 40, the gap between the decorative member 10 and the bearing member 30 may be eliminated by adjusting the position of the decorative member 10 in the positioning groove. When the bearing member 30 is designed, the depth and the width of the positioning groove may be adjusted to save materials for manufacturing the bearing member 30 and thus the weight of the bearing member 30 can be reduced.

The decorative assembly 1 provided in the embodiment further includes the adhesive member 40. A surface of the adhesive member 40 facing towards the decorative member 10 and a surface of the adhesive member 40 facing towards the bearing member 30 are both adhesive. The adhesive member 40 includes, but is not limited to, a double-sided tape, an instant adhesive, a quick adhesive, etc. As illustrated in FIG. 5, when the boss 20 just abuts against the support portion 301, a gap H between the adhesive member 40 and the adhesive surface 102 of the decorative member 10 has a value ranging from 1 mm to 5 mm. The adhesive member 40 may be arranged on the adhesive surface 102 of the decorative member 10, and a surface of the boss 20 close to the bearing member 30 is positioned protruding out of a surface of the adhesive member 40 close to the bearing member 30. Alternatively, the adhesive member 40 is arranged on the adhesive portion 302 of the bearing member 30, and a surface of the adhesive member 40 close to the decorative member 10 is positioned protruding out of a surface of the support portion 301 close to the decorative member 10. In the assembly process, the adhesive member 40 may be first arranged on the adhesive portion 302 of the bearing member 30 and then the adhesive member 40 is adhered to the decorative member 10, or the adhesive member 40 may be first arranged on the adhesive surface 102 of the decorative member 10 and then the adhesive member 40 is adhered to the bearing member 30. Preferably, in the embodiment, the adhesive member 40 is arranged on the adhesive portion 302 of the bearing member 30, arranged at the periphery of the support portion 301, and close to the adhesive surface 101 of the decorative member 10.

As illustrated in FIG. 4, in the assembly process, the decorative member 10 is not in contact with the adhesive member 40 in the case where the boss 20 does not abut against the bearing member 30. It may be understood that, in this case, the decorative member 10 is preliminarily positioned at the bearing member 30, and the decorative member 10 is not adhered to the adhesive member 40. Then the decorative member 10 and the boss 20 are moved in the direction towards the bearing member 30, that is, the boss 20 is moved in a direction towards the support portion 301 (e.g., a direction D1 illustrated in FIG. 5). As illustrated in FIG. 5, when the boss 20 just abuts against the support portion 301, the gap H is defined between the adhesive member 40 and the decorative member 10 (e.g., illustrated via a bold black line in FIG. 5), that is, the adhesive member 40 is not yet adhered to the decorative member 10. With the aid of the gap, secondary adjustment of the position of the decorative member 10 relative to the bearing member 30 may be performed to achieve fine adjustment, that is, a deviation between the bearing member 30 and the decorative member 10 may be eliminated by secondary adjustment of the position of the decorative member 10, thereby realizing fine adjustment of the decorative member 10. In an assembly process, with the boss 20 and the support portion 301 that are added to the decorative assembly 1 of the disclosure, the gap H between the adhesive member 40 and the decorative member 10 may be maintained. In other words, after the decorative member 10 is preliminarily positioned, the decorative member 10 is not still adhered to the adhesive member 40, so that secondary adjustment of the position of the decorative member 10 may be performed to eliminate the gap between the bearing member 30 and the decorative member 10, thereby improving the accuracy of positioning, which in turn reduces the wastage of the decorative member 1 and improves the yield.

In addition, after accurate positioning, an external force F may be continuously applied on the boss 20 in the direction D1 illustrated in FIG. 5, so that the decorative member 10 and the boss 20 may be moved continually in the direction towards the bearing member 30. The boss 20 is continuously moved in the direction D1 under the external force F, and when the boss 20 is moved to a certain position, the support portion 301 deforms, the boss 20 is at least partially received in the accommodating space of the support portion 301 (which may be understood as that the boss 20 is received in the support portion 301), and the decorative member 10 is adhered to the adhesive member 40. Therefore, as illustrated in FIG. 2, the decorative assembly 1 may be obtained through a simple and convenient assembly process.

The above introduces that the support portion 301 may deform. Optionally, the support portion 301 may elastically deform or plastically deform. The following will introduce specific structures of various support portions 301 in the disclosure.

In an embodiment, the support portion 301 may be elastic. As illustrated in FIG. 5, when the external force F is continuously applied to the support portion 301 by the boss 20, the boss 20 is continuously moved in the direction D1 until the gap H disappears and the adhesive member 40 is adhered to the decorative member 10. In this case, the whole support portion 301 plastically deforms or elastically deforms to define the accommodating space, and the boss 20 is partially received in the accommodating space, and thus the assembly is completed (as illustrated in FIG. 2). The structural member is simple and easy to operate, and is also easy to be manufactured.

Figure 6:
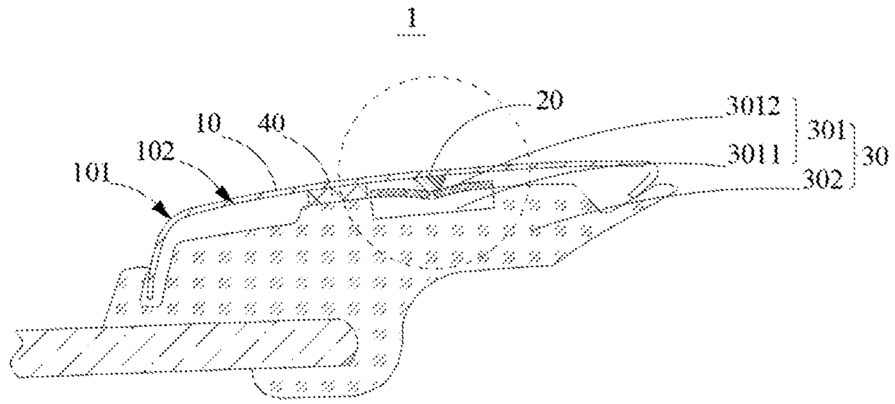
FIG. 6 is a schematic cross-sectional view of FIG. 1 provided in another embodiment of the disclosure, taken along line A-A.
Figure 7:
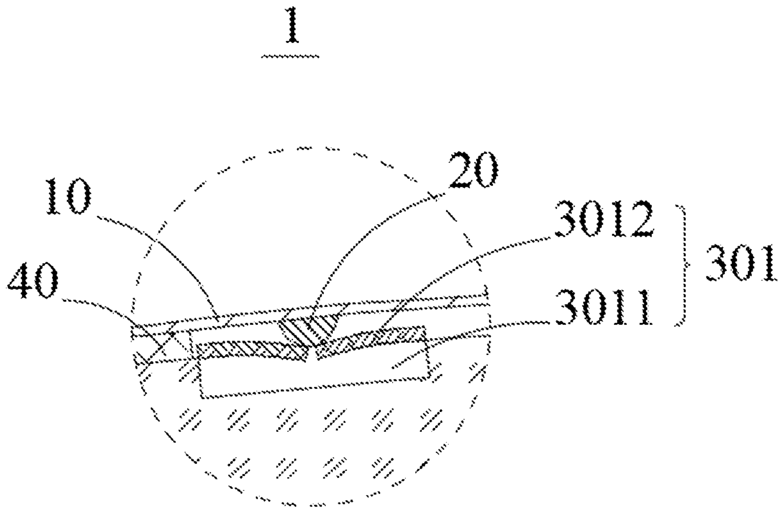
FIG. 7 is a partially enlarged view of FIG. 6.
Figure 8:
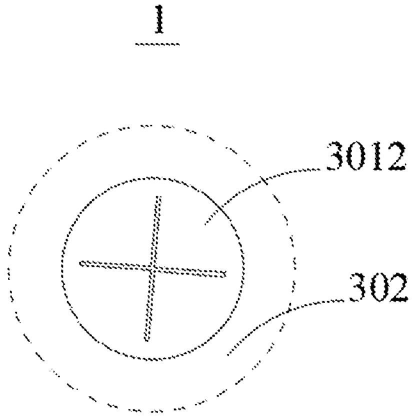
FIG. 8 is a partially top view of a bearing member provided in an embodiment of the disclosure.

As illustrated in FIGS. 6 to 8, FIG. 6 is a schematic cross-sectional view of FIG. 1 provided in another embodiment of the disclosure, taken along line A-A, FIG. 7 is a partially enlarged view of FIG. 6, and FIG. 8 is a partially top view of a bearing member provided in an embodiment of the disclosure.

In another embodiment, optionally, the support portion 301 is at least partially elastic. The support portion 301 includes multiple second portions 3012 spaced apart from each other and a first portion 3011. The adhesive portion 302 is arranged at a periphery of the first portion 3011, and the first portion 3011 defines an avoidance groove at a side of the first portion 3011 close to the decorative member 10. The multiple second portions 3012 are connected to the first portion 3011 and arranged corresponding to the periphery of the first portion 3011. Each of the multiple second portions 3012 is arranged extending towards remaining second portions 3012 in the multiple second portions 3012. When the decorative member 10 and the boss 20 are moved in the direction towards the bearing member 30 and the boss 20 applies pressure to each of the multiple second portions 3012, each of the multiple second portions 3012 at least partially deforms and is at least partially received in the avoidance groove, so as to define the accommodating space.

It may be noted that, the terms “first”, “second”, and the like used in the specification, the claims, and the accompany drawings of the disclosure are used to distinguish different objects rather than describe a particular order.

The support portion 301 provided in the embodiment includes the first portion 3011. The first portion 3011 may be in a shape including, but not limited to, a cylinder, an elliptical cylinder, a cube, a cuboid, etc. The avoidance groove is only required to be defined at a side of the first portion 3011 close to the boss 20, and the avoidance groove is configured to accommodate the boss 20. Preferably, the adhesive member 40 provided in the embodiment is arranged on the adhesive portion 302 at the periphery of the first portion 3011.

The support portion 301 provided in the embodiment further includes the multiple second portions 3012 connected to the first portion 3011. Both the first portion 3011 and the second portion 3012 may be in a shape including, but not limited to, a cylinder, an elliptical cylinder, a cube, a cuboid, etc. Preferably, as illustrated in FIG. 8, each of the multiple second portions 3012 in the embodiment is sector-shaped, and peripheries of the multiple second portions 3012 are connected to form a circle. Both the first portion 3011 and the second portion 3012 may be made of a material including, but not limited to, sponge, plastic, rubber, and the like. The second portion 3012 is closer to the boss 20 than the first portion 3011. The second portion 3012 is at least partially connected to the periphery of the first portion 3011. The second portion 3012 extends towards remaining second portions 3012 in the multiple second portions 3012, which may be understood as that the second portion 3012 extends toward a center of a plane where the first portion 3011 is connected to the second portion 3012. Optionally, the multiple second portions 3012 are at least partially spaced apart from each other by a gap ranging from 1 mm to 5 mm. The avoidance groove of the first portion 3011 is arranged corresponding to the gap between the multiple second portions 3012. The first portion 3011 and the multiple second portions 3012 of the bearing member 30 are integrally formed. For the convenience of understanding, the support portion 301 is artificially divided into the first portion 3011 and the multiple second portions 3012. In practical production, the first portion 3011 and the multiple second portions 3012 are integrally formed.

Figure 9:
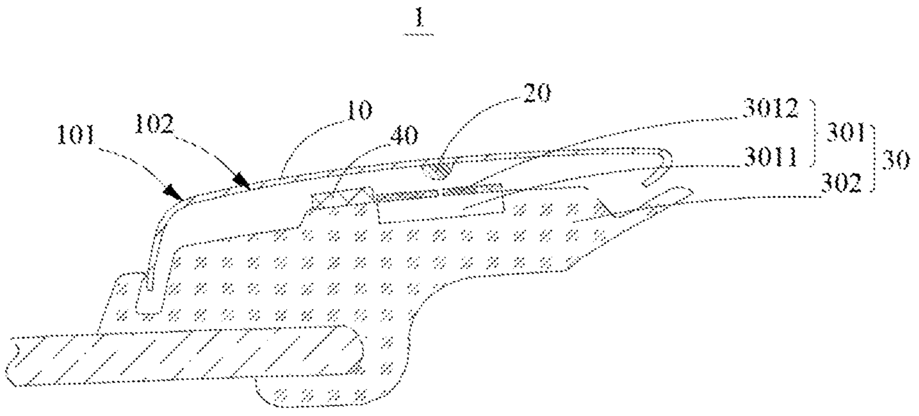
FIG. 9 is a schematic cross-sectional view of FIG. 1 when the boss does not abut against the support portion provided in another embodiment of the disclosure, taken along line A-A.
Figure 10:
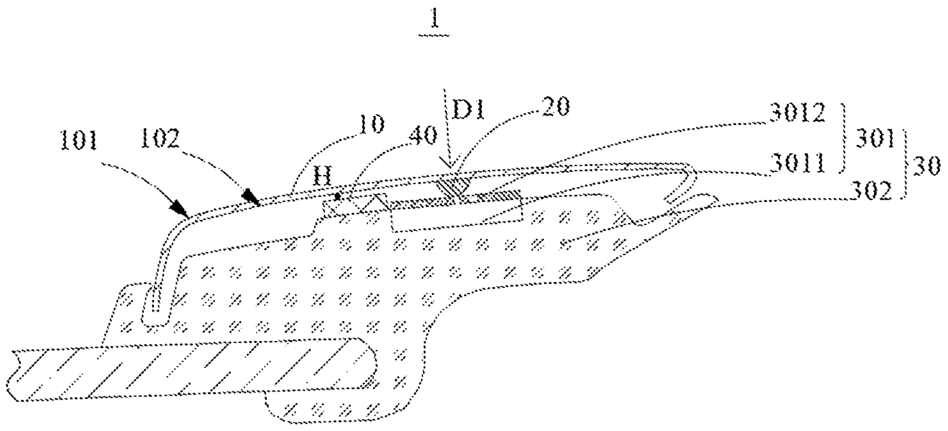
FIG. 10 is a schematic cross-sectional view of FIG. 1 when the boss abuts against the support portion and the adhesive member is not adhered to the decorative member provided in another embodiment of the disclosure, taken along line A-A.

As illustrated in FIGS. 9 to 10, FIG. 9 is a schematic cross-sectional view of FIG. 1 when the boss does not abut against the support portion provided in another embodiment of the disclosure, taken along line A-A, and FIG. 10 is a schematic cross-sectional view of FIG. 1 when the boss abuts against the support portion and the adhesive member is not adhered to the decorative member provided in another embodiment of the disclosure, taken along line A-A.

As illustrated in FIG. 10, in the assembly process, when the external force F is applied to the support portion 301 by the boss 20, the boss 20 is continuously moved in the direction D1, i.e., the boss 20 is continuously moved towards the gap between the multiple second portions 3012 until the gap H between the adhesive member 40 and the decorative member 10 disappears and the adhesive member 40 is adhered to the decorative member 10. In this case, under the external force, the multiple second portions 3012 deform and are bendably received in the avoidance groove of the first portion 3011, so that the support portion 301 defines the accommodating space to receive part of the boss 20, thereby completing the assembly (as illustrated in FIG. 6).

Optionally, the multiple second portions 3012 are arranged at a surface of the first portion 3011 close to the decorative member 10; or the surface of the first portion 3011 close to the decorative member 10 is flush with a surface of the second portion 3012 close to the decorative member 10.

As illustrated in FIG. 10, when the multiple second portions 3012 are arranged on the surface of the first portion 3011 close to the decorative member 10, that is, when the surface of the second portion 3012 close to the decorative member 10 is positioned protruding out of a surface of the adhesive portion 302 close to the decorative member 10, the boss 20 may be easier to be preliminarily positioned at the support portion 301, which may be understood as that it may take less time to make the boss 20 abut against the support portion 301, so that the gap H between the adhesive member 40 and the decorative member 10 may be relatively large, which is conducive to secondary adjustment of the decorative member 10.

Figure 11:
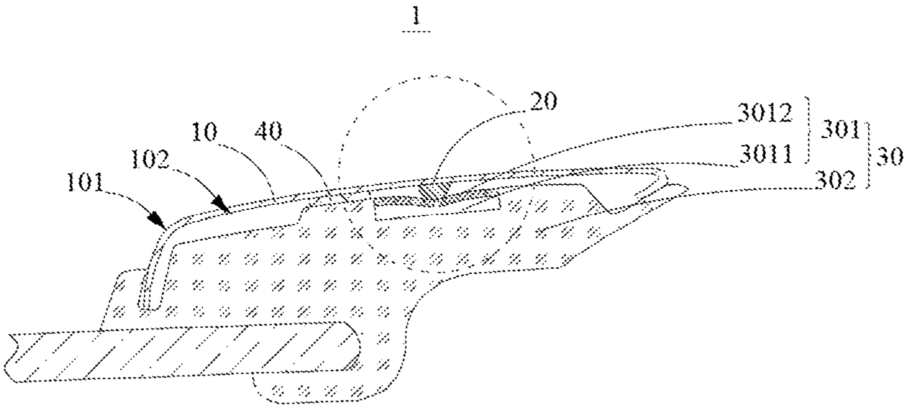
FIG. 11 is a schematic cross-sectional view of FIG. 1 provided in yet another embodiment of the disclosure, taken along line A-A.
Figure 12:
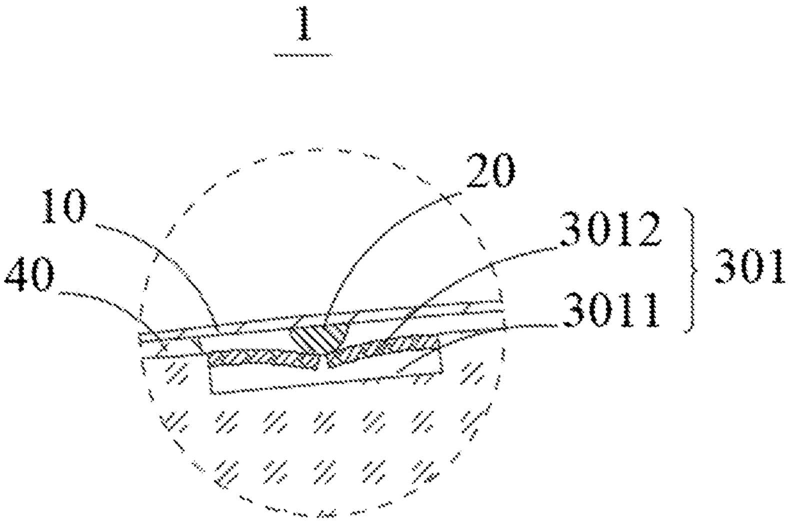
FIG. 12 is a partially enlarged view of FIG. 11.

As illustrated in FIG. 11 and FIG. 12, FIG. 11 is a schematic cross-sectional view of FIG. 1 provided in yet another embodiment of the disclosure, taken along line A-A, and FIG. 12 is a partially enlarged view of FIG. 11.

When the surface of the first portion 3011 close to the decorative member 10 is flush with the surface of the second portion 3012 close to the decorative member 10, that is, when the surface of the second portion 3012 close to the decorative member 10 is flush with the surface of the adhesive portion 302 close to the decorative member 10, the adhesive member 40 may be thinned, so that materials are saved. Furthermore, there is no need to consider a height at which the second portion 3012 protrudes from the surface of the adhesive portion 302, thereby simplifying the manufacture of the bearing member 30.

The above introduces the specific structures and the deformation of the support portion 301 during assembly. The following will introduce various specific structures of the boss 20 mentioned above.

Figure 13:
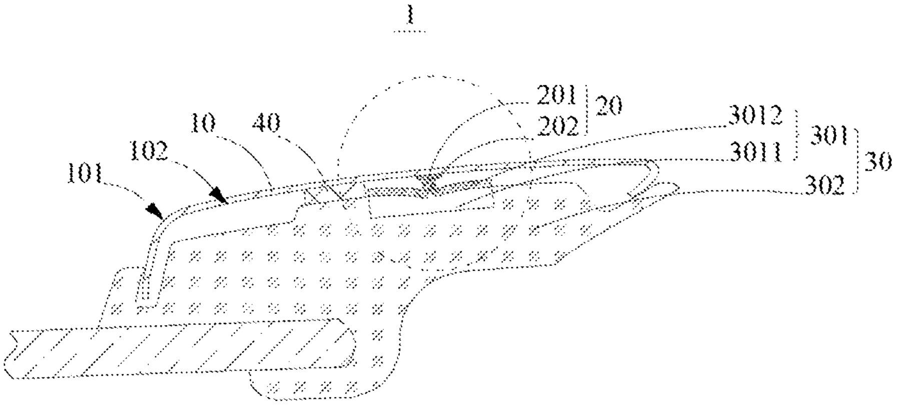
FIG. 13 is a schematic cross-sectional view of FIG. 1 provided in another embodiment of the disclosure, taken along line A-A.
Figure 14:
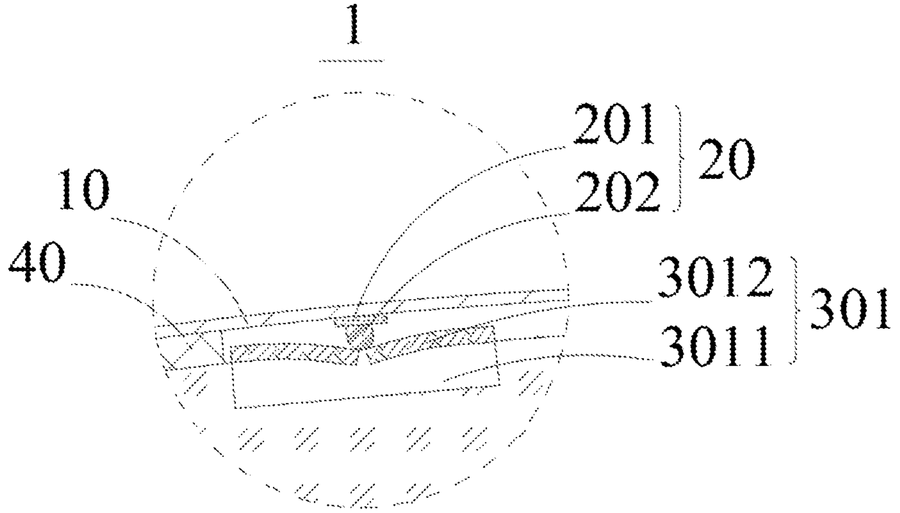
FIG. 14 is a partially enlarged view of FIG. 13.

As illustrated in FIG. 13 and FIG. 14, FIG. 13 is a schematic cross-sectional view of FIG. 1 provided in another embodiment of the disclosure, taken along line A-A, and FIG. 14 is a partially enlarged view of FIG. 13.

In another embodiment, the boss 20 includes a base 201 and a protruding portion 202 connected to the base 201. The base 201 is connected to the decorative member 10, and the protruding portion 202 is farther away from the decorative member 10 than the base 201.

The boss 20 provided in the embodiment includes the base 201 and the protruding portion 202. The base 201 is configured to connect the protruding portion 2022 with the decorative member 10, and the protruding portion 202 is configured for supporting to define the gap between the adhesive member 40 and the decorative member 10 in the assembly process. Both the base 201 and the protruding portion 202 may be in a shape including, but not limited to, a cylinder, an elliptical cylinder, a cube, a cuboid, etc. Preferably, as illustrated in FIG. 14, the base 201 in the embodiment is a cylinder, and the protruding portion 202 has a curved surface. The base 201 is connected to the decorative surface 101 of the decorative member 10, and the curved surface of the protruding portion 202 is close to the multiple second portions 3012 of the support portion 301 of the bearing member 30.

As illustrated in FIG. 13, when the assembly is completed, the multiple second portions 3012 of the support portion 301 deform, and both the protruding portion 202 and the second portion 3012 are partially received in the avoidance groove of the first portion 3011, such that the boss 20 is partially received in the support portion 301. A contact area between the base 201 and the decorative member 10 is larger than a contact area between the base 201 and the protruding portion 202, so as to improve connection between the boss 20 and the decorative member 10, i.e., the connection between the boss 20 and the decorative member 10 may be more stable. A cross-sectional width of the protruding portion 202 may be reduced by designing the shape of the protruding portion 202, thereby saving manufacturing materials.

Figure 15:
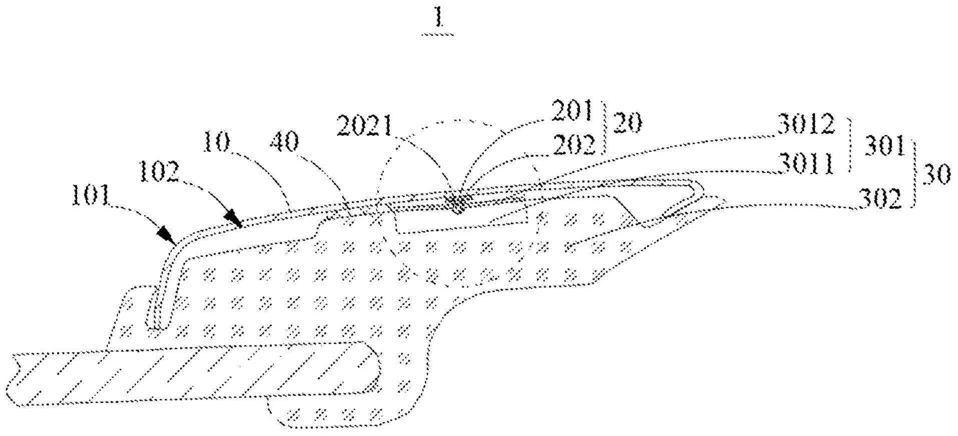
FIG. 15 is a schematic cross-sectional view of FIG. 1 provided in another embodiment of the disclosure, taken along line A-A.
Figure 16:
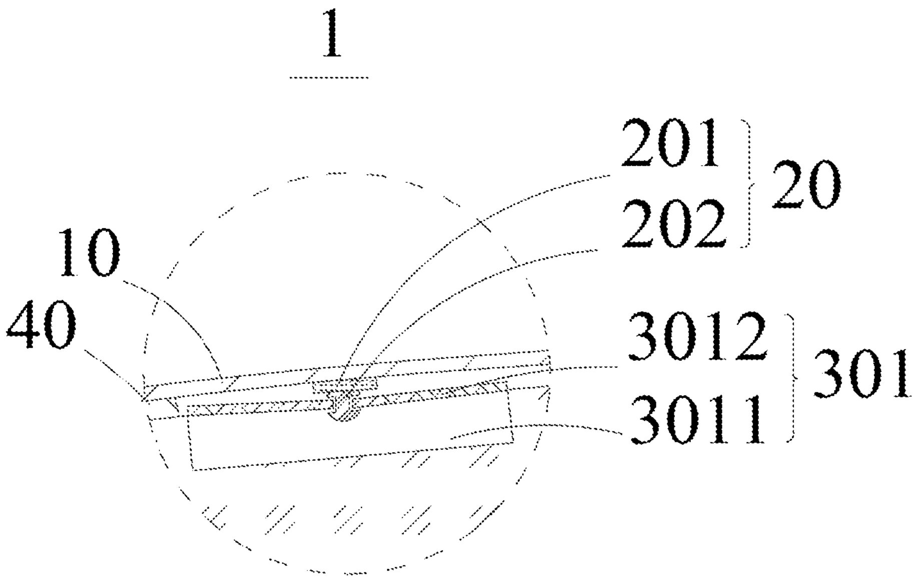
FIG. 16 is a partially enlarged view of FIG. 15.
Figure 17:
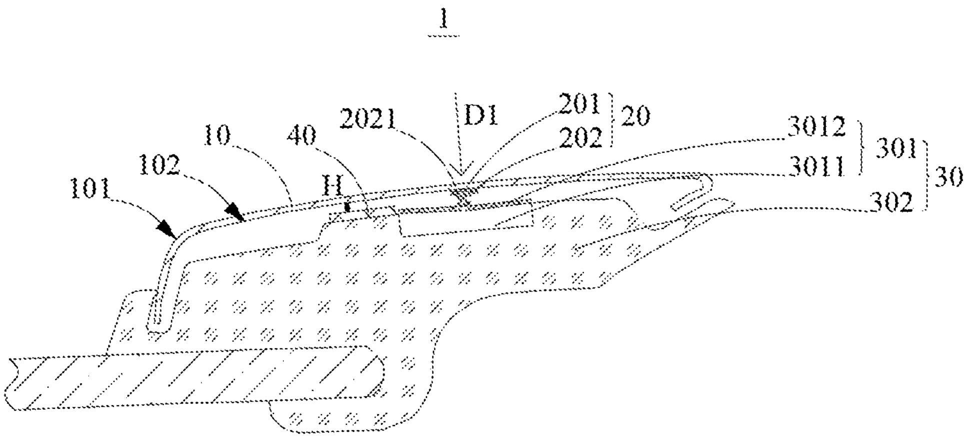
FIG. 17 is a schematic cross-sectional view of FIG. 1 when the boss abuts against the support portion and the adhesive member is not adhered to the decorative member, provided in another embodiment of the disclosure, taken along line A-A.

As illustrated in FIG. 15 to FIG. 17, FIG. 15 is a schematic cross-sectional view of FIG. 1 provided in another embodiment of the disclosure, taken along line A-A, FIG. 16 is a partially enlarged view of FIG. 15, and FIG. 17 is a schematic cross-sectional view of FIG. 1 when the boss abuts against the support portion and the adhesive member is not adhered to the decorative member provided in another embodiment of the disclosure, taken along line A-A.

In another embodiment, the boss 20 defines a mounting space 2021 at a peripheral side of the boss 20. When the decorative member 10 and the boss 20 are moved in the direction towards the bearing member 30 and the boss 20 applies pressure to each of the multiple second portions

3012, each of the multiple second portions 3012 at least partially deforms to define the accommodating space, then restores and is partially received in the mounting space 2021, and the boss 20 is partially received in the avoidance groove.

The boss 20 provided in the embodiment defines the mounting space 2021. The mounting space 2021 has a cavity structure and is defined at the peripheral side of the boss 20. The cavity structure includes, but is not limited to, a hole, a groove, etc. The mounting space 2021 has an opening facing towards the multiple second portions 3012 in a horizontal direction. The mounting space 2021 may be in a shape including, but not limited to, a cylinder, an elliptical cylinder, a cube, a cuboid, etc., as long as the multiple second portions 3012 of the support portion 301 can be partially received in the mounting space 2021 (as illustrated in FIG. 16).

As illustrated in FIG. 17, in the assembly process, when the external force Fis applied to the support portion 301 by the boss 20, the boss 20 is continuously moved in the direction D1, i.e., the protruding portion 202 of the boss 20 is continuously moved towards the gap between the multiple second portions 3012 until the gap H between the adhesive member 40 and the decorative member 10 disappears and the adhesive member 40 is adhered to the decorative member 10. In this case, under the external force, the multiple second portions 3012 deform and are bendably received in the avoidance groove of the first portion 3011. The mounting space 2021 is continuously moved until the end of the second portion 3012 is aligned with the mounting space 2021, at this point, the second portion 3012 restores and is received in the mounting space 2021, thereby completing the assembly (as illustrated in FIG. 15). With the aid of the mounting space 2021, a reaction force of the second portion 3012 of the support portion 301 on the boss 20 may be avoided, and thus the connection between the boss 20 and the support portion 301 may be more stable, which means that the connection between the decorative member 10 and the bearing member 30 is more stable. In addition, in all the above embodiments, the reaction force of the support portion 301 on the boss 20 ranges from ON to 5N, which may be understood as that the reaction force of the support portion 301 on the boss 20 is at least less than an adhesive force between the decorative member 10 and the adhesive member 40, that is, the reaction force is insufficient to separate the decorative member 10 from the adhesive member 40.

In addition to the decorative assembly 1 mentioned above, the disclosure further provides an assembly method of the decorative assembly 1. The decorative assembly 1 and the assembly method of the decorative assembly 1 provided in embodiments of the disclosure are needed to be used together. For example, in an embodiment, the decorative assembly 1 above may be assembled with the assembly method of the decorative assembly 1 provided in the following.

Figure 18:
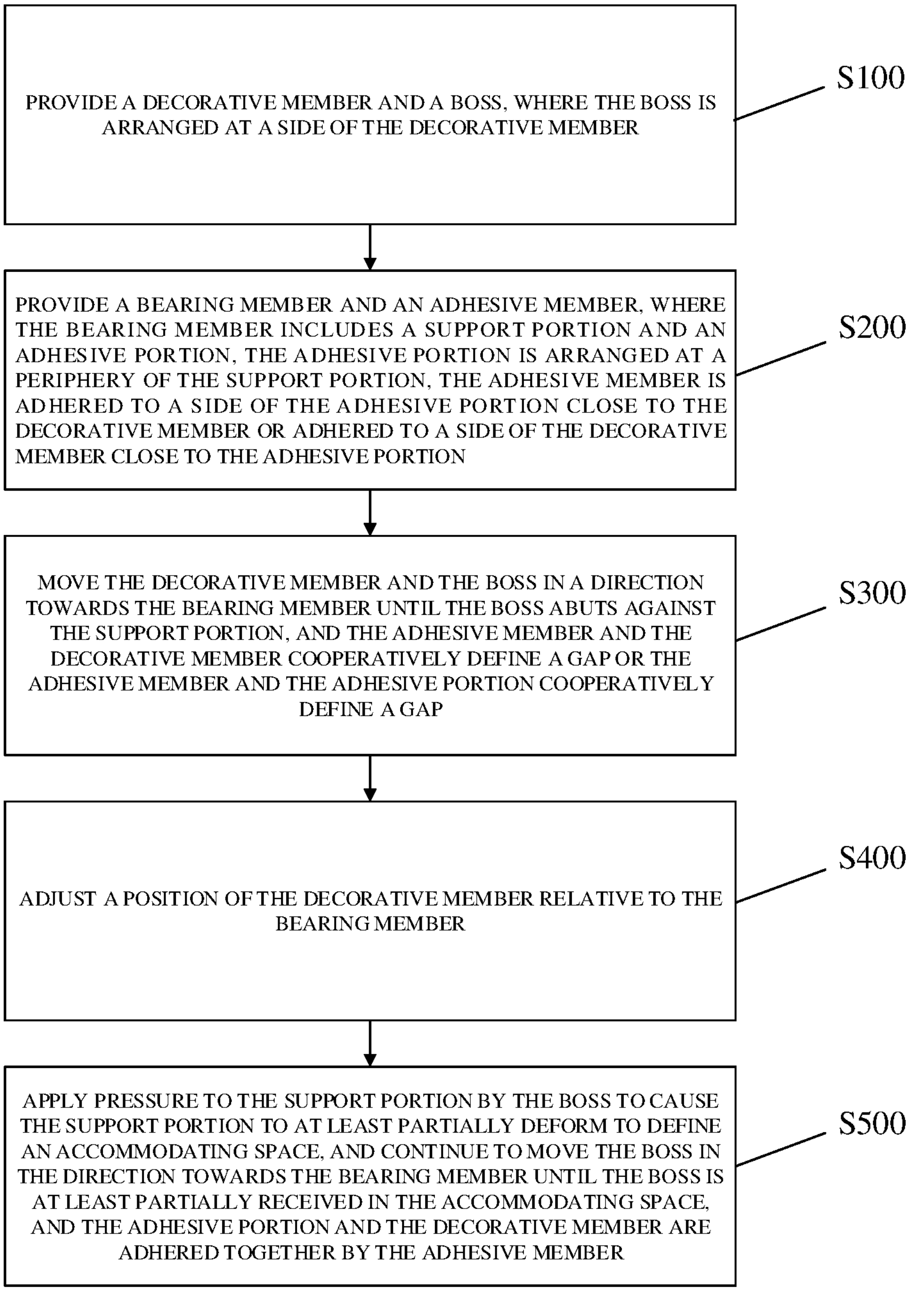
FIG. 18 is an assembly flow chart of an assembly method of a decorative assembly provided in an embodiment of the disclosure.

As illustrated in FIG. 18, FIG. 18 is a flow chart of an assembly method of the decorative assembly provided in an embodiment of the disclosure. An assembly method of the decorative assembly 1 is provided in the embodiment. The assembly method includes operations at S100, S200, S300, S400, and S500. Detailed introduction of the operations at S100, S200, S300, S400, and S500 is as follows.

At S100, provide a decorative member 10 and a boss 20, where the boss 20 is arranged at a side of the decorative member 10.

At S200, provide a bearing member 30 and an adhesive member 40. The bearing member 30 includes a support portion 301 and an adhesive portion 302. The adhesive portion 302 is arranged at a periphery of the support portion 301. The adhesive member 40 is adhered to a side of the adhesive portion 302 close to the decorative member 10 or adhered to a side of the decorative member 10 close to the adhesive portion 302.

At S300, move the decorative member 10 and the boss 20 in a direction towards the bearing member 30 until the boss 20 abuts against the support portion 301, and the adhesive member 40 and the decorative member 10 cooperatively define a gap or the adhesive member 40 and the adhesive portion 302 cooperatively define a gap.

At S400, adjust a position of the decorative member 10 relative to the bearing member 30.

At S500, apply pressure to the support portion 301 by the boss 20 to cause the support portion 301 to at least partially deform to define an accommodating space, and continue to move the boss 20 in the direction towards the bearing member 30 until the boss 20 is at least partially received in the accommodating space, and the adhesive portion 302 and the decorative member 10 are adhered together by the adhesive member 40.

With the assembly method provided in the disclosure, move the decorative member 10 and the boss 20 in the direction towards the bearing member 30 until the boss 20 abuts against the support portion 301, and the adhesive member 40 and the decorative member 10 cooperatively define a gap (which may be understood as that the adhesive member 40 is separated from the decorative member 10 by the boss 20 and the adhesive member 40 is not adhered to the decorative member 10) or the adhesive member 40 and the adhesive portion 302 cooperatively define a gap (which may be understood as that the adhesive member 40 is not adhered to the adhesive portion 302). Therefore, there is a chance for secondary adjustment of the position of the decorative member 10 to eliminate the gap between the bearing member 30 and the decorative member 10, so as to improve positioning accuracy and a yield.

In addition, after secondary adjustment of the position of the decorative member 10, apply pressure to the support portion 301 by the boss 20 to eliminate the gap between the adhesive member 40 and the decorative member 10 or the gap between the adhesive member 40 and the adhesive portion 302, i.e., the decorative member 10 and the adhesive portion 302 are adhered together by the adhesive member 40. In this case, the support portion 301 deforms, and the boss 20 is continuously moved to be partially received in the support portion 301. The support portion 301 defines the accommodating space to receive part of the boss 20, so that it may be easy to assemble the decorative assembly 1.

As illustrated in FIG. 6, FIG. 10, and FIG. 19, FIG. 19 is an assembly flow chart of the operation at S500 in FIG. 18. The operation at S500 includes an operation at S510. The operation at S510 will be introduced in detail in the following.

The support portion 301 includes multiple second portions 3012 spaced apart from each other and a first portion 3011. The adhesive portion 302 is arranged at a periphery of the first portion 3011. The first portion 3011 defines an avoidance groove at a side of the first portion 3011 close to the decorative member 10. The multiple second portions 3012 are connected to the first portion 3011 and arranged corresponding to the periphery of the first portion 3011. Each of the multiple second portions 3012 is arranged extending towards remaining second portions 3012 in the multiple second portions 3012.

At S510, move the decorative member 10 and the boss 20 in the direction towards the bearing member 30 to apply pressure to each of the multiple second portions 3012 by the boss 20 until each of the multiple second portions 3012 at least partially deforms and is at least partially received in the avoidance groove to define the accommodating space.

The first portion 3011 and the multiple second portions 3012 are described above in detail, which will not be repeated herein. Optionally, as illustrated in FIG. 10, when pressure is applied to the support portion 301 in the direction D1 by the boss 20, the boss 20 is continuously moved towards the second portion 3012 until the gap H between the adhesive member 40 and the decorative member 10 disappears, that is, the adhesive member 40 is adhered to the decorative member 10. At this point, under the external force, the second portion 3012 deforms and is bendably received in the avoidance groove of the first portion 3011, so that the support portion 301 defines the accommodating space to receive part of the second portion 3012, thereby completing the assembly (as illustrated in FIG. 6).

As illustrated in FIG. 15, FIG. 17, and FIG. 20, FIG. 20 is a flow chart illustrating an operation after the operation at S510 in FIG. 19. The operation at S510 includes an operation at S511. The operation at S511 will be introduced in detail in the following.

A mounting space 2021 is defined at a peripheral side of the boss 20.

At S511, continue to apply pressure to the second portion 3012 by the boss 20 to continuously move the boss 20 towards the avoidance groove. When the boss 20 is moved a preset distance, the second portion 3012 restores and is received in the mounting space 2021, and the boss 20 is partially received in the avoidance groove.

The mounting space 2021 is described above in detail, which will not be repeated herein. Optionally, as illustrated in FIG. 17, apply pressure to the support portion 301 in the direction D1 by the boss 20, so that the boss 20 is continuously moved towards the second portion 3012 until the gap H between the adhesive member 40 and the decorative member 10 disappears, that is, the adhesive member 40 is adhered to the decorative member 10. At this point, under the external force, the second portion 3012 deforms and is bendably received in the avoidance groove of the first portion 3011. As the boss 20 is continuously moved, the multiple second portions 3012 restore and are received in the mounting space 2021 of the boss 20, thereby completing the assembly (as illustrated in FIG. 15).

Figure 22:
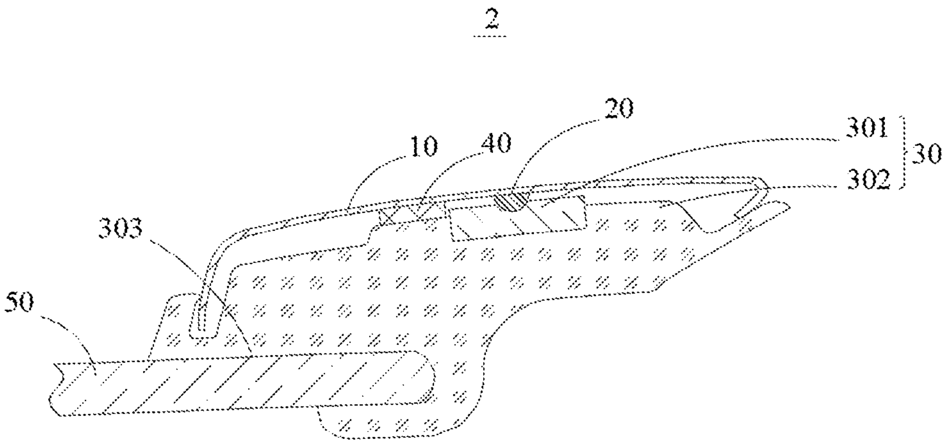
FIG. 22 is a schematic cross-sectional view of the vehicle window in FIG. 21, taken along line B-B.

As illustrated in FIG. 21 and FIG. 22, FIG. 21 is a top view of a vehicle window provided in an embodiment of the disclosure, and FIG. 22 is a sectional view of the vehicle window in FIG. 21, taken along line B-B.

A vehicle window 2 is further provided in the disclosure. The vehicle window 2 includes a window body 50 and the decorative assembly 1. The vehicle window 2 is assembled with the assembly method of the decorative assembly 1. The bearing member 30 defines an accommodating groove 303 at a side of the bearing member 30. The window body 50 is partially received in the accommodating groove 303, and the window body 50 and the decorative member 10 are arranged at two adjacent sides of the bearing member 30.

The decorative assembly 1 and the assembly method of the decorative assembly 1 are described above in detail, which will not be repeated herein. Specifically, the bearing member 30 in the embodiment may be an encapsulation. The vehicle window 2 may be obtained by integrally forming the encapsulation and the window body 50 or separately forming and assembling the encapsulation and the window body 50. The boss 20 is arranged on the decorative member 10, and the support portion 301 facing towards the boss 20 is arranged on the bearing member 30 of the vehicle window 2. Optionally, when the boss 20 abuts against the support portion 301, the adhesive member 40 and the decorative member 10 cooperatively define a gap to ensure that the adhesive member 40 is not adhered to the decorative member 10. Therefore, there is a chance for secondary adjustment of the position of the decorative member 10 to eliminate the gap between the decorative member 10 and the bearing member 30, thereby improving a yield of vehicle decorative assemblies.

The above embodiments of the disclosure are described in detail. Principles and embodiments of the disclosure are elaborated with specific embodiments herein. The illustration of embodiments above is only used to help understanding of methods and core ideas of the disclosure. In addition, embodiments and application scopes of the disclosure may be changed according to ideas of the disclosure by those of ordinary skill in the art. In summary, contents of this specification should not be understood as limitation on the present disclosure.

What is claimed is:

1. A decorative assembly, comprising:

a decorative member;

a bearing member, wherein the bearing member is arranged at a side of the decorative member and comprises a support portion and an adhesive portion, and the adhesive portion is arranged at a periphery of the support portion;

a boss, wherein the boss is arranged at a side of the decorative member close to the bearing member and arranged facing towards the support portion; and an adhesive member, wherein the adhesive member is arranged between the adhesive portion and the decorative member; wherein when the decorative member and the boss are moved in a direction towards the bearing member and the boss abuts against the support portion, the adhesive member and the decorative member cooperatively define a gap, or the adhesive member and the adhesive portion cooperatively define a gap, so that the decorative member is movable relative to the bearing member to adjust a position of the decorative member relative to the bearing member; when the boss applies pressure to the support portion, the support portion at least partially deforms to define an accommodating space, the boss is at least partially received in the accommodating space, and the adhesive portion and the decorative member are adhered together by the adhesive member.

2. The decorative assembly of claim 1, wherein the support portion comprises a plurality of second portions spaced apart from each other and a first portion, wherein the adhesive portion is arranged at a periphery of the first portion, the first portion defines an avoidance groove at a side of the first portion close to the decorative member, the plurality of second portions are connected to the first portion and arranged corresponding to the periphery of the first portion, and each of the plurality of second portions is arranged extending towards remaining second portions in the plurality of second portions; and when the decorative member and the boss are moved in the direction towards the bearing member and the boss applies pressure to each of the plurality of second portions, each of the plurality of second portions at least partially deforms and is partially received in the avoidance groove, so as to define the accommodating space.

3. The decorative assembly of claim 2, wherein the boss defines a mounting space at a peripheral side of the boss; when the decorative member and the boss are moved in the direction towards the bearing member and the boss applies pressure to each of the plurality of second portions, each of the plurality of second portions first at least partially deforms to define the accommodating space, and then restores and is partially received in the mounting space, and the boss is partially received in the avoidance groove.

4. The decorative assembly of claim 2, wherein the plurality of second portions are arranged on a surface of the first portion close to the decorative member.

5. The decorative assembly of claim 2, wherein a surface of the first portion close to the decorative member is flush with a surface of each of the plurality of second portions close to the decorative member.

6. The decorative assembly of claim 1, wherein the support portion is elastic.

7. The decorative assembly of claim 1, wherein the boss comprises a base and a protruding portion connected to the base, wherein the base is connected to the decorative member, and the protruding portion is farther away from the decorative member than the base.

8. The decorative assembly of claim 7, wherein a contact area between the base and the decorative member is larger than a contact area between the base and the protruding portion.

9. The decorative assembly of claim 7, wherein the protruding portion has a curved surface facing towards the support portion.

10. An assembly method of a decorative assembly, comprising:

providing a decorative member and a boss, wherein the boss is arranged at a side of the decorative member;

providing a bearing member and an adhesive member, wherein the bearing member comprises a support portion and an adhesive portion arranged at a periphery of the support portion, and the adhesive member is adhered to a side of the adhesive portion close to the decorative member or adhered to a side of the decorative member close to the adhesive portion;

moving the decorative member and the boss in a direction towards the bearing member until the boss abuts against the support portion, and the adhesive member and the decorative member cooperatively define a gap or the adhesive member and the adhesive portion cooperatively define a gap;

adjusting, with the aid of the gap, a position of the decorative member relative to the bearing member; and applying pressure to the support portion by the boss to cause the support portion to at least partially deform to define an accommodating space, and continuing to move the boss in the direction towards the bearing member until the boss is at least partially received in the accommodating space, and the adhesive portion and the decorative member are adhered together by the adhesive member.

11. The assembly method of a decorative assembly of claim 10, wherein the support portion comprises a plurality of second portions spaced apart from each other and a first portion, the adhesive portion is arranged at a periphery of the first portion, the first portion defines an avoidance groove at a side of the first portion close to the decorative member, the plurality of second portions are connected to the first portion and are arranged corresponding to the periphery of the first portion, and each of the plurality of second portions is arranged extending towards remaining second portions in the plurality of second portions; and wherein applying pressure to the support portion by the boss to cause the support portion to at least partially deform to define the accommodating space comprises:

moving the decorative member and the boss in the direction towards the bearing member to apply pressure to each of the plurality of second portions by the boss until each of the plurality of second portions at least partially deforms and is at least partially received in the avoidance groove to define the accommodating space.

12. The assembly method of the decorative assembly of claim 11, wherein the boss defines a mounting space at a peripheral side of the boss, and after moving the decorative member and the boss in the direction towards the bearing member to apply pressure to each of the plurality of second portions by the boss until each of the plurality of second portions at least partially deforms and is at least partially received in the avoidance groove to define the accommodating space, the method further comprises:

continuing to apply pressure to the plurality of second portions by the boss to continuously move the boss towards the avoidance groove, wherein when the boss is moved a preset distance, each of the plurality of second portions restores and is received in the mounting space, and the boss is partially received in the avoidance groove.

13. A vehicle window, comprising:

a window body; and a decorative assembly comprising:

a decorative member;

a bearing member, wherein the bearing member is arranged at a side of the decorative member and comprises a support portion and an adhesive portion, and the adhesive portion is arranged at a periphery of the support portion, and wherein the bearing member defines an accommodating groove at a side of the bearing member, the window body is partially received in the accommodating groove, and the window body and the decorative member are arranged at two adjacent sides of the bearing member;

a boss, wherein the boss is arranged at a side of the decorative member close to the bearing member and arranged facing towards the support portion; and an adhesive member, wherein the adhesive member is arranged between the adhesive portion and the decorative member; wherein when the decorative member and the boss are moved in a direction towards the bearing member and the boss abuts against the support portion, the adhesive member and the decorative member cooperatively define a gap, or the adhesive member and the adhesive portion cooperatively define a gap; when the boss applies pressure to the support portion, the support portion at least partially deforms to define an accommodating space, the boss is at least partially received in the accommodating space, and the adhesive portion and the decorative member are adhered together by the adhesive member.

14. The vehicle window of claim 13, wherein the support portion comprises a plurality of second portions spaced apart from each other and a first portion, wherein the adhesive portion is arranged at a periphery of the first portion, the first portion defines an avoidance groove at a side of the first portion close to the decorative member, the plurality of second portions are connected to the first portion and arranged corresponding to the periphery of the first portion, and each of the plurality of second portions is arranged extending towards remaining second portions in the plurality of second portions; and when the decorative member and the boss are moved in the direction towards the bearing member and the boss applies pressure to each of the plurality of second portions, each of the plurality of second portions at least partially deforms and is partially received in the avoidance groove, so as to define the accommodating space.

15. The vehicle window of claim 14, wherein the boss defines a mounting space at a peripheral side of the boss; when the decorative member and the boss are moved in the direction towards the bearing member and the boss applies pressure to each of the plurality of second portions, each of the plurality of second portions first at least partially deforms to define the accommodating space, and then restores and is partially received in the mounting space, and the boss is partially received in the avoidance groove.

16. The vehicle window of claim 14, wherein the plurality of second portions are arranged on a surface of the first portion close to the decorative member.

17. The vehicle window of claim 14, wherein a surface of the first portion close to the decorative member is flush with a surface of each of the plurality of second portions close to the decorative member.

18. The vehicle window of claim 13, wherein the boss comprises a base and a protruding portion connected to the base, wherein the base is connected to the decorative member, and the protruding portion is farther away from the decorative member than the base.

19. The vehicle window of claim 18, wherein a contact area between the base and the decorative member is larger than a contact area between the base and the protruding portion.

20. The decorative assembly of claim 1, wherein the boss has a curved surface facing away from the decorative member.

* * * * *